Dec. 4, 1934.   J. OSTERMEIER   1,983,394
PHOTOFLASH DEVICE
Filed Jan. 28, 1931
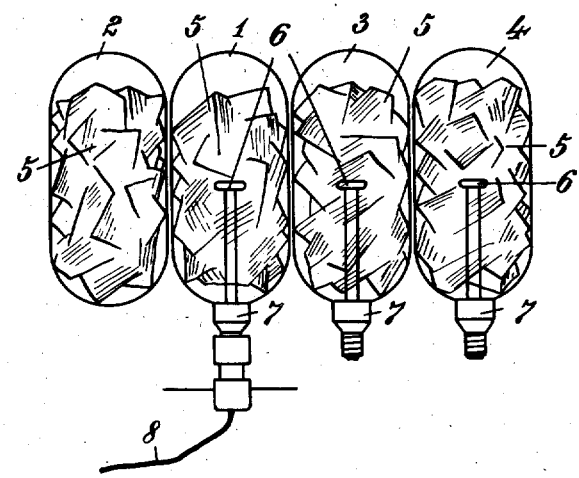
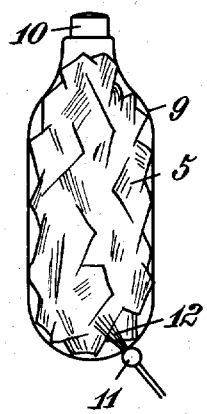
Inventor:
Johannes Ostermeier
By *[signature]*
Attorney.

Patented Dec. 4, 1934

1,983,394

UNITED STATES PATENT OFFICE 1,983,394

PHOTOFLASH DEVICE

Johannes Ostermeier, Althegnenberg, Germany, assignor, by mesne assignments, to General Electric Company, a corporation of New York Application January 28, 1931, Serial No. 511,918
In Germany February 10, 1930

10 Claims. (Cl. 67—31)

My invention relates to apparatus and means for initiating a chemical reaction in a closed vessel.

It is an object of my invention to perform such initiation without conducting means such as current connections and the like.

To this end I carry out a primary reaction outside the vessel by which the secondary reaction in the vessel is initiated.

It is another object of my invention to provide apparatus for performing my process.

To this end I provide a closed vessel containing a charge for the secondary reaction, in combination with means for carrying out the primary reaction outside the vessel.

My invention has particular reference, but is not limited to, flash-light lamps, and will now be described with reference to the accompanying drawing in which flash-light lamps are illustrated by way of example.

In the drawing

Fig. 1 is an elevation of a battery of flash-light lamps,

Fig. 2 is an elevation of a flash-light lamp adapted to be ignited by a Tesla transformer, and Fig. 3 is an elevation of a lamp having a priming charge.

Referring now to the drawing, and first to Fig. 1, the battery includes a flash-light lamp or primary vessel 1, in which the primary reaction is started, and 2, 3, and 4 are secondary vessels, also flash-light lamps, in which the secondary reaction is initiated. All lamps have glass bulbs with a charge therein consisting of oxidizable metal, preferably metal foil, 5, and an atmosphere containing oxygen or a mixture of gases. The primary lamp 1, and two of the secondary lamps, 3 and 4, are equipped with an ignition device 6 and a socket 7 but only the primary lamp 1 has means for supplying current to its ignition device 6. The secondary lamp 2 is without any ignition means.

If by means of the ignition connection 8 the primary lamp 1 is ignited the secondary lamps 2, 3, and 4 ignite almost instantaneously. It is obvious that by the new ignition process economy in electrical connections is effected and that in addition a lamp as 2 is appreciably cheaper and more convenient to handle than a lamp provided with a socket 7 and an ignition device 6.

Arrangements are old in which the chemical reactions of components enclosed within a housing are initiated by an ignition effected within the housing. An example is afforded by a flash-light lamp for photographic purposes in which metal foils are enclosed within a vessel in oxygen, an atmosphere containing oxygen, or yielding oxygen. Reaction is brought about by an electric ignition device in the vessel to which energy is supplied from an electric battery or the like.

I have found that flash-light lamps which are not connected to the source of electric energy, like the secondary lamps 2, 3, and 4, are ignited by igniting the lamp 1, or, in general, if a flash-light lamp is ignited in their vicinity. The secondary lamps do not require ignition means but only a charge which is adapted to be ignited by the primary ignition in the first lamp 1.

There is as yet no strict explanation of this phenomenon, but it may be assumed that the energy for initiating the secondary reaction is transmitted to the secondary lamp in the form of radiation generated by the primary reaction. It may be a heat radiation but it may also be a light radiation, with a wave length of the order of 550 to 630 $\mu\mu$.

It is not essential that the secondary and primary reactions should be identical, or even similar. Each reaction may be carried out with different substances or compounds.

In general, my invention includes all processes of causing ignition by radiation.

The secondary reaction is not limited to the generation of light and it is not necessarily the primary object but its action may be to initiate any other process as may be desired, for example, blasting.

My process may also be performed by causing a high-frequency generator to develop sparks which strike the vessel, or by connecting the vessel directly to one terminal of the generator. Preferably the vessel is equipped with a grounded sleeve and the gas of its charge is under such pressure that the electric discharge through the gas is facilitated.

A flash-light lamp of this type is illustrated in Fig. 2, 9 being the vessel which is similar to that of the lamp 2 in Fig. 1, with a charge 5, but is equipped with a grounded sleeve of metal 10 at its upper end, and 11 is an electrode of a high-frequency generator, for instance, a Tesla transformer. If the vessel 9 is brought adjacent the electrode 11 the sparks 12 in the vessel ignite the charge. The action is assisted by the grounded sleeve 10 which forms the opposite electrode to the electrode 11. The pressure of the gas in the vessel may be selected as described. The sleeve 10 may be omitted and the vessel grounded by holding it in the hand.

Furthermore, the ignition of the charge 5 may be performed by means of a primer within the vessel which may be in contact with the inside of the vessel, or in heat-conducting connection therewith, and is heated to ignition temperature by heating the vessel with a flame or by heat radiation, or by heating the primer by optical concentration of heat rays.

A primer lamp is shown in Fig. 3. Its vessel is made exactly like that of the lamp in Fig. 2, and need not be described. 13 is the primer, and 14 is a match the flame of which heats the primer 10. An oxygen carrier may be admixed with the primer substance.

When the primer is heated by the flame of the match 14, or by any other suitable means, as mentioned above, the primer is ignited and its ignition is transmitted to the charge in the vessel. This lamp, like the one in Fig. 2, may also be ignited by means of a Tesla transformer or other source of high-frequency energy. If it is without the sleeve 10 it is held in the hand, like the lamp in Fig. 2.

The primer 13 may be dispensed with and the charge 5 may be ignited directly by a suitably concentrated source of thermic energy.

It is a particularly advantageous feature of my invention that the several ignition processes may be combined with each other and also with the normal ignition by supplying energy through a conductor. Thus, a vessel having a normal ignition device, like the vessel 1 in Fig. 1, and a primer 13, like the vessel in Fig. 3, may be screwed into a socket for an incandescent lamp, and ignited by the current in the system, or its threaded sleeve may be grounded and the charge ignited by Tesla or other sparks from a high-frequency generator, or the vessel may be mounted insulated altogether and ignited by heating its primer, as described.

It will be understood that the ignition may be performed quite independently of any source of electric energy and its connections, and the difficulties involved in the simultaneous ignition of several lamps in the old way, are eliminated. The lamps in the battery Fig. 1 ignite all together notwithstanding the fact that only one of them is connected to a source of electric energy, and even this connection may be dispensed with.

I claim:

1. A photo-flash lamp comprising a closed vessel, a foil in said vessel, and means entirely outside of and in proximity to said vessel for producing radiant energy to ignite said foil.

2. In a device of the class described, the combination of a bulb containing a combustible and a combustion supporting agent and a completely extraneous device in proximity to said bulb for producing radiant energy to ignite said combustible.

3. In a device of the class described, the combination of a bulb containing a combustible and a combustion supporting gas and a completely extraneous device in proximity to said bulb for producing radiant energy to ignite said combustible.

4. In a device of the class described, the combination of a bulb containing a loose filling of foil and a combustion supporting gas and a completely extraneous device in proximity to said bulb for producing radiant energy to ignite said combustible.

5. In a device of the class described, the combination of a bulb containing a combustible and a combustion supporting agent but having no ignition means therein and a similar device in proximity to said bulb comprising an ignition means.

6. A flashing device comprising a plurality of bulbs adjacent one another and each containing a loose filling of foil and a combustion supporting gas, one only of said bulbs containing also an ignition means.

7. A flashing device comprising a plurality of bulbs adjacent one another and each containing a loose filling of foil and a combustion supporting gas, one only of said bulbs containing also an electrical ignition means.

8. A flashing device comprising a bulb containing a combustible and a combustion supporting agent and electrical means outside of said bulb for effecting a high frequency discharge through said bulb for igniting said combustible.

9. A flashing device comprising a bulb containing a loose filling of foil and a combustion supporting gas and electrical means outside of said bulb for effecting a high frequency discharge through said bulb for igniting said combustible.

10. A flashing device comprising a bulb containing a combustible, a combustion supporting agent and a primer in heat conducting relation with the wall of said bulb and means outside said bulb for igniting said primer.

JOHANNES OSTERMEIER.

CERTIFICATE OF CORRECTION.

Patent No. 1,983,394.

December 4, 1934.

JOHANNES OSTERMEIER.

It is hereby certified that error appears in the printed specification of the above numbered patent requiring correction as follows: Page 2, line 96, claim 4, for "combustible" read foil; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.

of the gas in the vessel may be selected as described. The sleeve 10 may be omitted and the vessel grounded by holding it in the hand.

Furthermore, the ignition of the charge 5 may be performed by means of a primer within the vessel which may be in contact with the inside of the vessel, or in heat-conducting connection therewith, and is heated to ignition temperature by heating the vessel with a flame or by heat radiation, or by heating the primer by optical concentration of heat rays.

A primer lamp is shown in Fig. 3. Its vessel is made exactly like that of the lamp in Fig. 2, and need not be described. 13 is the primer, and 14 is a match the flame of which heats the primer 10. An oxygen carrier may be admixed with the primer substance.

When the primer is heated by the flame of the match 14, or by any other suitable means, as mentioned above, the primer is ignited and its ignition is transmitted to the charge in the vessel. This lamp, like the one in Fig. 2, may also be ignited by means of a Tesla transformer or other source of high-frequency energy. If it is without the sleeve 10 it is held in the hand, like the lamp in Fig. 2.

The primer 13 may be dispensed with and the charge 5 may be ignited directly by a suitably concentrated source of thermic energy.

It is a particularly advantageous feature of my invention that the several ignition processes may be combined with each other and also with the normal ignition by supplying energy through a conductor. Thus, a vessel having a normal ignition device, like the vessel 1 in Fig. 1, and a primer 13, like the vessel in Fig. 3, may be screwed into a socket for an incandescent lamp, and ignited by the current in the system, or its threaded sleeve may be grounded and the charge ignited by Tesla or other sparks from a high-frequency generator, or the vessel may be mounted insulated altogether and ignited by heating its primer, as described.

It will be understood that the ignition may be performed quite independently of any source of electric energy and its connections, and the difficulties involved in the simultaneous ignition of several lamps in the old way, are eliminated. The lamps in the battery Fig. 1 ignite all together notwithstanding the fact that only one of them is connected to a source of electric energy, and even this connection may be dispensed with.

I claim:

1. A photo-flash lamp comprising a closed vessel, a foil in said vessel, and means entirely outside of and in proximity to said vessel for producing radiant energy to ignite said foil.

2. In a device of the class described, the combination of a bulb containing a combustible and a combustion supporting agent and a completely extraneous device in proximity to said bulb for producing radiant energy to ignite said combustible.

3. In a device of the class described, the combination of a bulb containing a combustible and a combustion supporting gas and a completely extraneous device in proximity to said bulb for producing radiant energy to ignite said combustible.

4. In a device of the class described, the combination of a bulb containing a loose filling of foil and a combustion supporting gas and a completely extraneous device in proximity to said bulb for producing radiant energy to ignite said combustible.

5. In a device of the class described, the combination of a bulb containing a combustible and a combustion supporting agent but having no ignition means therein and a similar device in proximity to said bulb comprising an ignition means.

6. A flashing device comprising a plurality of bulbs adjacent one another and each containing a loose filling of foil and a combustion supporting gas, one only of said bulbs containing also an ignition means.

7. A flashing device comprising a plurality of bulbs adjacent one another and each containing a loose filling of foil and a combustion supporting gas, one only of said bulbs containing also an electrical ignition means.

8. A flashing device comprising a bulb containing a combustible and a combustion supporting agent and electrical means outside of said bulb for effecting a high frequency discharge through said bulb for igniting said combustible.

9. A flashing device comprising a bulb containing a loose filling of foil and a combustion supporting gas and electrical means outside of said bulb for effecting a high frequency discharge through said bulb for igniting said combustible.

10. A flashing device comprising a bulb containing a combustible, a combustion supporting agent and a primer in heat conducting relation with the wall of said bulb and means outside said bulb for igniting said primer.

JOHANNES OSTERMEIER.

CERTIFICATE OF CORRECTION.

Patent No. 1,983,394.  December 4, 1934.

JOHANNES OSTERMEIER.

It is hereby certified that error appears in the printed specification of the above numbered patent requiring correction as follows: Page 2, line 96, claim 4, for "combustible" read foil; and that the said Letters Patent should be read with this correction therein that the same may conform to the record of the case in the Patent Office.

Signed and sealed this 12th day of February, A. D. 1935.

(Seal)

Leslie Frazer
Acting Commissioner of Patents.